(12) United States Patent
Lee et al.

(10) Patent No.: US 11,581,773 B2
(45) Date of Patent: Feb. 14, 2023

(54) FLAT-ANGLED COIL HAVING THREE-DIMENSIONAL SHAPE FOR MAXIMIZING SPACE FACTOR AND ELECTRIC MOTOR COMPRISING SAME

(71) Applicant: KOREA INSTITUTE OF INDUSTRIAL TECHNOLOGY, Cheonan-si (KR)

(72) Inventors: Eui Chun Lee, Daegu (KR); Soon O Kwon, Daegu (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 209 days.

(21) Appl. No.: 16/976,078

(22) PCT Filed: Feb. 28, 2019

(86) PCT No.: PCT/KR2019/002400
§ 371 (c)(1),
(2) Date: Aug. 27, 2020

(87) PCT Pub. No.: WO2019/168360
PCT Pub. Date: Sep. 6, 2019

(65) Prior Publication Data
US 2020/0403474 A1 Dec. 24, 2020

(30) Foreign Application Priority Data
Feb. 28, 2018 (KR) .................. 10-2018-0024771

(51) Int. Cl.
*H02K 3/12* (2006.01)
*H02K 3/28* (2006.01)
*H02K 3/46* (2006.01)

(52) U.S. Cl.
CPC ................ *H02K 3/28* (2013.01); *H02K 3/12* (2013.01); *H02K 3/46* (2013.01)

(58) Field of Classification Search
CPC .. H02K 3/12; H02K 3/28; H02K 3/46; H02K 2203/06
See application file for complete search history.

(56) References Cited

FOREIGN PATENT DOCUMENTS

| JP | 2006187162 A | 7/2006 |
|----|---|---|
| JP | 2007295698 A | 11/2007 |
| JP | 2011091920 A | 5/2011 |
| JP | 2017028831 A | 2/2017 |
| KR | 101772047 B1 | 8/2017 |

OTHER PUBLICATIONS

International Search Report dated May 31, 2019 for PCT/KR2019/002400.

*Primary Examiner* — Ramon M Barrera
(74) *Attorney, Agent, or Firm* — Cantor Colburn LLP

(57) ABSTRACT

A flat-angled coil having a three-dimensional shape for maximizing a space factor according to the present invention comprises a unit coil comprising multiple layers which are provided to surround the peripheries of teeth of a core provided on an electric motor and laminated along the longitudinal direction of the teeth of the core so as to be integrally connected to each other continuously. The unit coil is formed such that at least a part of an adjacent portion thereof, which is adjacent to another unit coil provided in the same slot formed between the surrounded teeth of the core and the teeth of an adjacent core, is non-parallel with the side surfaces of the surrounded teeth of the core.

9 Claims, 11 Drawing Sheets

FLAT-ANGLED COIL HAVING THREE-DIMENSIONAL SHAPE FOR MAXIMIZING SPACE FACTOR AND ELECTRIC MOTOR COMPRISING SAME

TECHNICAL FIELD

The present invention relates to a flat-angled coil applicable to an electric motor and an electric motor comprising the same, and more particularly, to a flat-angled coil capable of maximizing a space factor in a slot by a unique three-dimensional shape and an electric motor comprising the same.

BACKGROUND ART

In recent years when research for increasing the efficiency of electric motors is actively being conducted, the improvement of the efficiency of electric motors and generators used in electric vehicles and power generation facilities may cause a very great economic effect.

Accordingly, as a part of the method for improving the efficiency of the electric motor, various methods for improving a coil space factor or conductor occupying ratio of a coil wound around a rotor or stator of the electric motor and generator have been studied.

As a general method for improving such a coil space factor, a method of increasing a diameter of the coil wound around the stator or the rotor or increasing the number of windings has been mainly used.

However, in the case of conventional coils, a copper wire having a circular shape in a vertical cross section is mainly commonly used, and when the diameter of such a circular coil is increased, a wasted space between the wound coil layers occurs due to the circular cross section, and thus, there is a fundamental problem that the space factor of the coil is lowered.

On the other hand, when a coil having a too small diameter is wound, the number of windings is increased compared to the same area, and thus, a decrease in efficiency and a heat generation problem may be caused due to a relative increase in electrical resistance.

Such a conventional electric motor has a problem that there is a limitation that efficiency and output density cannot be increased by a certain level or higher due to a low space factor.

Therefore, there is a need for methods to solve these problems.

DISCLOSURE

Technical Problem

The present invention is the invention derived to solve the problems in the related art described above, and an object of the present invention is to provide a flat-angled coil which is formed to have a higher space factor than that of a circular coil in the related art and is able to be simply assembled to an electric motor.

The objects of the present invention are not limited to the aforementioned objects, and other objects, which are not mentioned above, will be apparently understood to those skilled in the art from the following description.

Technical Solution

In order to achieve the objects, a flat-angled coil having a three-dimensional shape for maximizing a space factor according to the present invention comprises a unit coil comprising multiple layers which are provided to surround the peripheries of teeth of a core provided on an electric motor and laminated along the longitudinal direction of the teeth of the core so as to be integrally connected to each other continuously, wherein the unit coil is formed such that at least a part of an adjacent portion thereof, which is adjacent to another unit coil provided in the same slot formed between the surrounded teeth of the core and the teeth of an adjacent core, is non-parallel with the side surfaces of the surrounded teeth of the core.

The adjacent portion of the unit coil may be formed to be non-parallel with side surfaces of the teeth of the core surrounded in a continuous straight shape throughout the multiple layers.

An angle between the side surfaces of the teeth of the core surrounded by the unit coil and the adjacent portion may be determined by a geometric shape of the unit coil, which may be changed according to the number of slots provided in the electric motor.

Each layer of the unit coil may comprise a slot insertion region inserted into a slot between the teeth of the cores adjacent to each other, and an exposure region which is connected to form a predetermined angle from the slot insertion region and provided outside the slot.

The unit coil may be formed so that the width of the slot insertion region is gradually increased toward the layer in the outer diameter portion direction from the inner diameter portion of the electric motor.

The unit coil may have the same width of the exposure region formed for each layer.

The unit coil may be formed so that the thickness thereof is gradually decreased toward the layer in the outer diameter portion direction from the inner diameter portion of the electric motor.

In both end portions of the unit coil, end winding connection portions to which an end winding member for connection with another unit coil is connected may be formed.

An end portion of the unit coil may be provided within a laterally cross-sectional range of the unit coil, and the end winding connection portion may be formed so that at least a part of the width of the end portion of the unit coil is removed to form a step in a lateral direction.

An end portion of the unit coil may be provided within a laterally cross-sectional range of the unit coil, and the end winding connection portion may be formed so that at least a part of the thickness of the end portion of the unit coil is removed to form a step in a vertical direction.

The end winding connection portion may be formed to protrude above the laterally cross-sectional range of the unit coil.

Advantageous Effects

A flat-angled coil having a three-dimensional shape for maximizing a space factor of the present invention to solve the above-described problems has the following effects.

First, since the flat-angled coil has a relatively high space factor to the same structure compared to a conventional circular coil, there is an advantage in that it is possible to produce high-efficiency electric motors and generators.

Second, the conventional coil is manufactured by shearing the shape of each end coil portion with a press, and a subsequent process to weld or bond a joint portion is required, whereas in the present invention, the entire unit coil is formed in an integrated shape to have no joint portion or welding portion, and thus, there is an advantage that it is advantageous to secure electrical properties and physical rigidity.

The effects of the present invention are not limited to the aforementioned effect, and other effects, which are not mentioned above, will be apparently understood to those skilled in the art from the description of the appended claims.

BEST MODE

Figure 1:
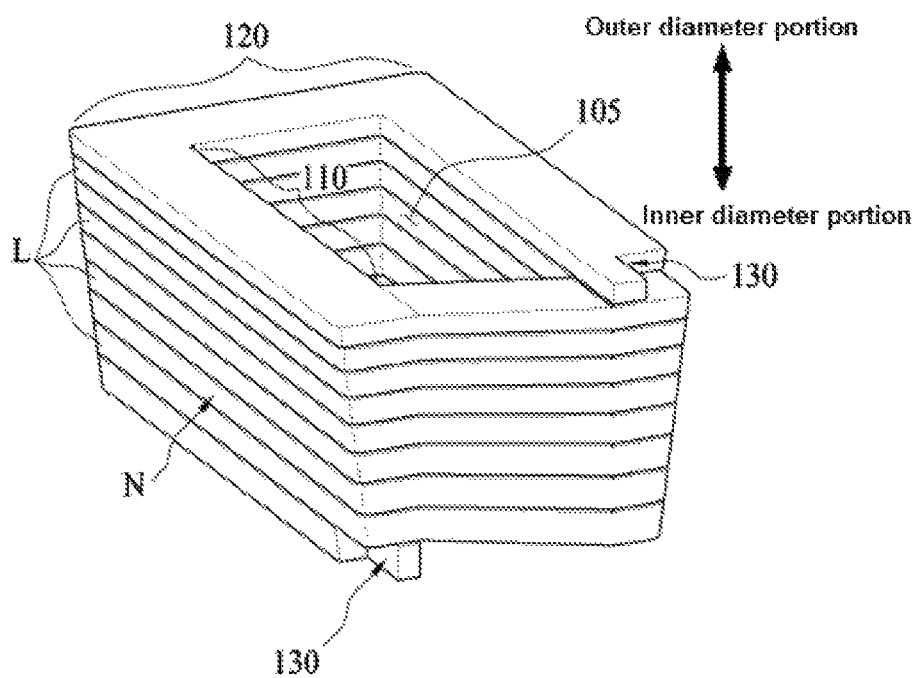
FIG. 1 is a view illustrating an overall appearance of a unit coil in a flat-angled coil according to a first embodiment of the present invention.

Hereinafter, a preferred embodiment of the present invention, in which an object of the present invention can be realized in detail, will be described with reference to the accompanying drawings. In describing the embodiment, like names and like reference numerals are used with respect to like components and the resulting additional description will be omitted.

Meanwhile, in the following description, terms indicating directions such as an outer diameter portion, an inner diameter portion, a front surface, a side surface, a flat surface, a lower surface, etc. are arbitrarily defined for convenience of description in every point, and of course, the corresponding expressions do not limit the scope of the present invention.

FIG. 1 is a view illustrating an overall appearance of a unit coil 100 in a flat-angled coil according to a first embodiment of the present invention.

Figure 2:
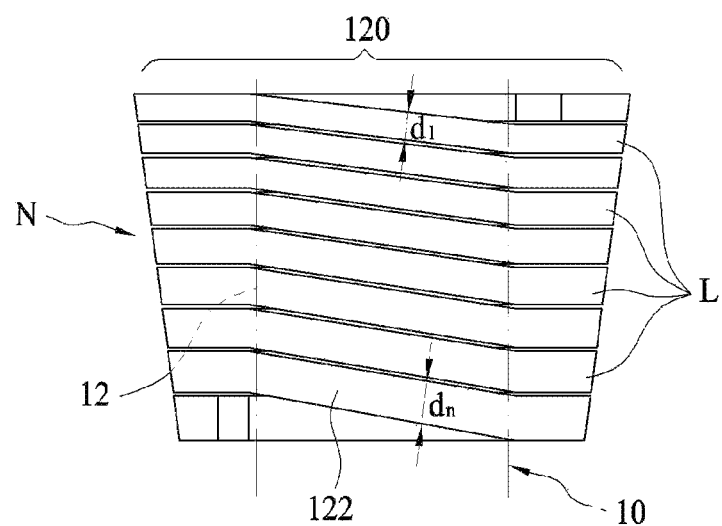
FIG. 2 is a view illustrating a front appearance of the unit coil in the flat-angled coil according to the first embodiment of the present invention.
Figure 3:
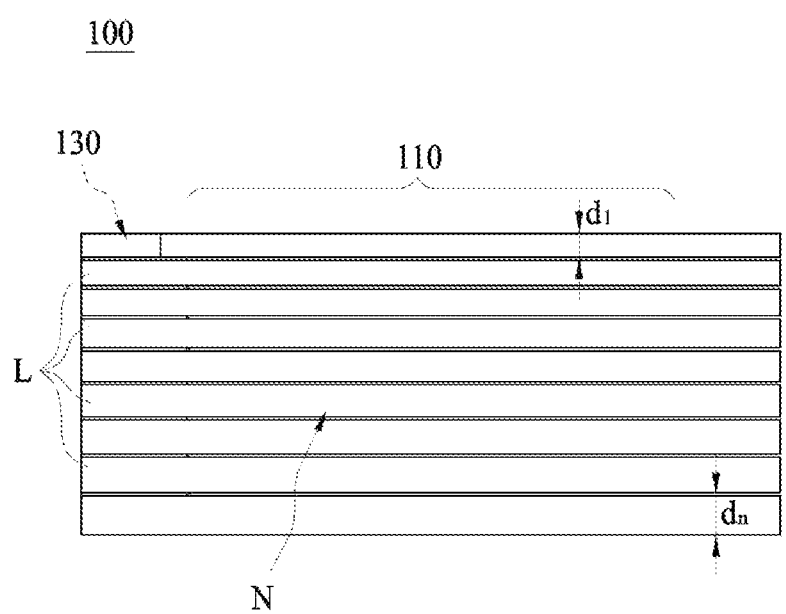
FIG. 3 is a view illustrating a side appearance of the unit coil in the flat-angled coil according to the first embodiment of the present invention.
Figure 4:
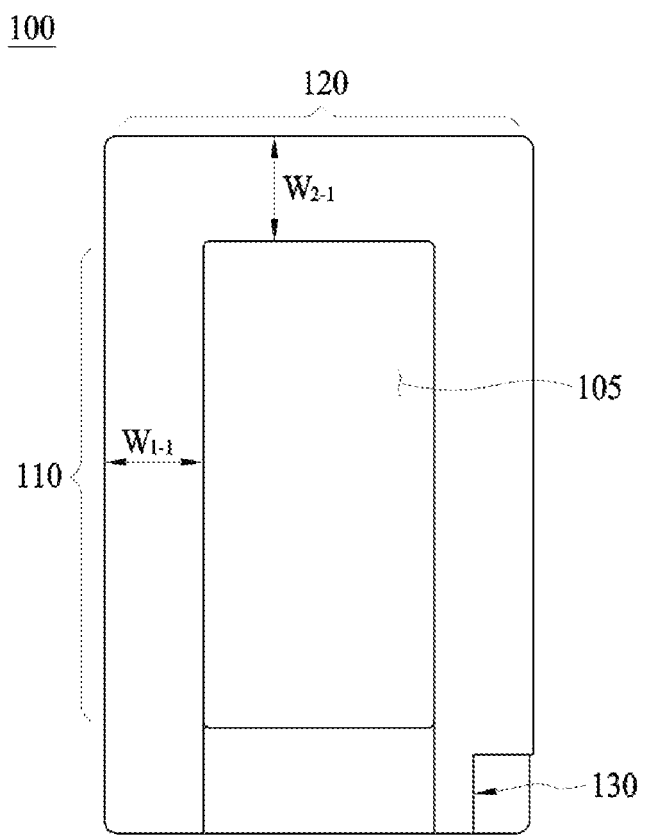
FIG. 4 is a view illustrating a flat appearance of the unit coil in the flat-angled coil according to the first embodiment of the present invention.
Figure 5:
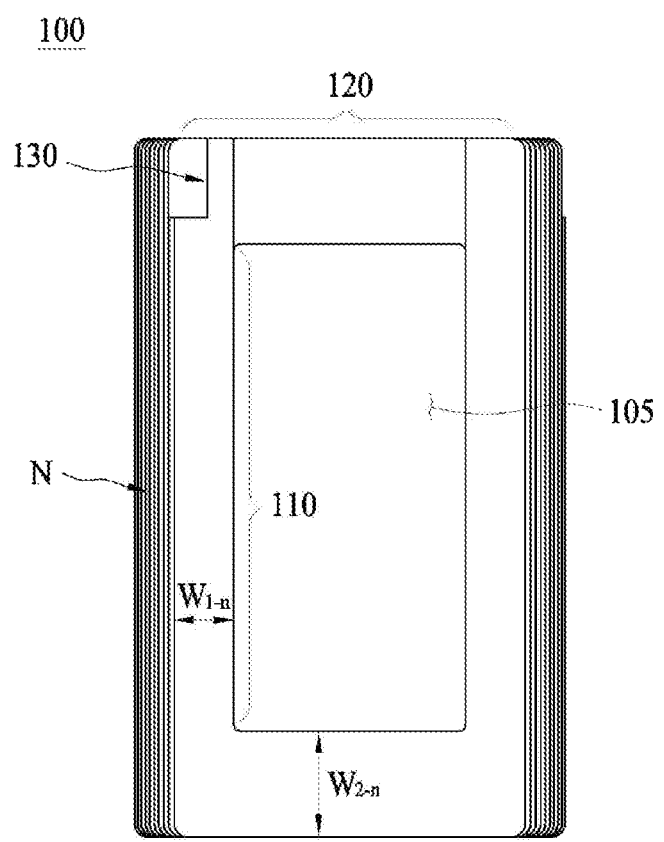
FIG. 5 is a view illustrating a lower appearance of the unit coil in the flat-angled coil according to the first embodiment of the present invention.

In addition, FIGS. 2 to 5 illustrate various angular appearances of the unit coil 100 in the flat-angled coil according to the first embodiment of the present invention, respectively, wherein FIG. 2 illustrates a front surface of the unit coil 100, FIG. 3 illustrates a side surface of the unit coil 100, FIG. 4 illustrates a flat surface of the unit coil 100, and FIG. 5 illustrates a lower surface of the unit coil 100.

In addition, the unit coil 100 may be formed of a metal or an electrical material having electrical conductivity.

As illustrated in FIGS. 1 to 5, the unit coil 100 is provided to surround peripheries of teeth of a core 10 (see FIGS. 2 and 7) provided in an electric motor, and has a shape including multiple layers L which are continuously connected to each other in an integrated form and laminated along the longitudinal direction of the teeth of the core 10. In addition, a hollow portion 105 into which the teeth of the core 10 are inserted may be formed inside the unit coil 100. At this time, the core 10 may be a magnetic material having permeability.

That is, the unit coil 100 may have a shape in which all the layers L are integrally formed as a whole, and may have a meaningful shape capable of minimizing electrical resistance while maximizing a space factor in the slot of the electric motor.

For example, each layer L of the unit coil 100 may have a different geometric shape from each other, and the shape thereof may be changed for each region even on one layer L.

In the embodiment, the unit coil 100 has a shape in which at least a part of an adjacent portion N adjacent to another unit coil 100 provided in the same slot formed between the surrounded teeth of the core 10 (see FIG. 2) and the teeth of another adjacent core 10 is formed in non-parallel with side surfaces of the surrounded teeth of the core 10.

In the slot formed between a pair of adjacent cores 10, portions of different unit coils 100 from each other are inserted into the slot, respectively, and side portions of the unit coils 100 adjacent to each other that are inserted into one slot to occupy a space form the adjacent portion N. That is, the adjacent portion N refers to a surface facing another adjacent unit coil 100.

As described above, the adjacent portion N is formed in non-parallel with the side surfaces of the teeth of the core 10, and the reason is to maximize a space factor in the slot.

Specifically, in the embodiment, the adjacent portion N of the unit coil 100 has a shape formed in non-parallel with side surfaces 12 (see FIG. 2) of the teeth of the core which are surrounded in a continuous straight shape throughout the multiple layers L. That is, the side portion of the unit coil 100 has a tapered shape as a whole, and the width of each layer L gradually increases from an inner diameter portion to an outer diameter portion of the electric motor.

Accordingly, the unit coil 100 of the embodiment may fill a space in the slot together with another adjacent unit coil 100 without any gap, and may have a space factor maximized compared to the related art.

At this time, an angle between the side surfaces 12 of the teeth of the core 10 surrounded by the unit coil 100 and the adjacent portion N may be determined by a geometric shape according to the number of slots provided in the electric motor, and specifically, an angle of the adjacent portion N may be determined by dividing a central angle of the electric motor according to the number of slots.

Meanwhile, each layer L of the unit coil 100 may include a slot insertion region 110, which is a region inserted into a slot between the teeth of the cores 10 adjacent to each other, and an exposure region 120 which is connected to form a predetermined angle from the slot insertion region 110 and provided outside the slot.

In the embodiment, since the teeth of the core 10 are formed in quadrangular shapes, each layer L of the unit coil 100 includes a pair of slot insertion regions 110 spaced apart from each other with the teeth of the core 10 interposed therebetween and a pair of exposure regions 120 connecting the pair of slot insertion regions 110.

In other words, the slot insertion region 110 refers to a region completely accommodated in the slot between the teeth of the cores 10 adjacent to each other, and the exposure region 120 refers to a region exposed to the outside without being inserted into the slot.

In this case, the exposure region 120 may include an inclined portion 122 formed in an inclined shape to connect the layers L to each other in order to connect the individual layers L to each other, as illustrated in FIG. 2.

Hereinafter, a more specific shape of the unit coil 100 will be described with reference to FIGS. 2 to 5.

First, as illustrated in FIGS. 2 and 3, in the embodiment, the unit coil 100 may be formed to gradually decrease in thickness toward the layer L in the outer diameter portion direction from the inner diameter portion of the electric motor.

That is, assuming that there are n layers L of the unit coil 100, thicknesses $d_1$ to $d_n$ of the layers are gradually increased toward a layer L located on an innermost inner diameter portion of the electric motor from a layer L located on an outermost outer diameter portion of the electric motor.

The reason is that the width of each layer L decreases toward the inner diameter portion of the electric motor relatively as the adjacent portion N is formed in an inclined shape as described above to increase the efficiency while lowering the resistance of the corresponding layer L to a certain level or higher by compensating for the decreased width as a thickness.

In addition, as illustrated in FIGS. 4 and 5, in the embodiment, the unit coil 100 may be formed to gradually increase in widths $W_{1-n}$ to $W_{1-1}$ of the slot insertion regions 110 toward the layer L in the outer diameter portion direction from the inner diameter portion of the electric motor.

That is, assuming that there are n layers L of the unit coil 100, the widths $W_{1-n}$ to $W_{1-1}$ of the layers may be gradually increased toward a layer L located on an innermost inner diameter portion of the electric motor from a layer L located on an outermost outer diameter portion of the electric motor.

Accordingly, as illustrated in FIG. 5, when viewed from the lower surface of the unit coil 100, it can be seen that the slot insertion region 110 located at the outer diameter portion of the electric motor protrudes more laterally.

As a result, the adjacent portion N of the unit coil 100 has something in common with having a shape formed in non-parallel with the side surfaces 12 of the teeth of the core surrounded in a continuous straight shape throughout the multiple layers L, and as illustrated in FIG. 2, the unit coil 100 has a trapezoidal shape as a whole when viewed from the front surface.

However, the adjacent portion N of the unit coil 100 is not limited to a shape formed in a straight shape throughout the entire layers L, and so long as the width of the slot insertion region 110 is increased toward the layer L in the outer diameter portion direction from the inner diameter portion of the electric motor, the adjacent portion N may not be formed in a straight shape.

In addition, in the embodiment, the unit coil 100 may have the same widths $W_{2-1}$ to $W_{2-n}$ of the exposure region 120 for each layer L.

That is, unlike the slot insertion region 110, the exposure region 120 is formed to have constant widths $W_{2-1}$ to $W_{2-n}$ regardless of the location of the layer L, and accordingly, as illustrated in FIG. 3, the unit coil 100 has a rectangular shape as a whole when viewed from the side surface.

The reason for this is to easily mount external components such as a heat dissipating plate on an outer surface of the exposure region 120 while minimizing an occupied area of the electric motor by flattening an outer surface of the exposure region 120. In addition, of course, it is possible to maximize the performance of the electric motor by minimizing the electric resistance in the exposure region 120 of each layer L.

As described above, since the present invention has a relatively high space factor to the same structure compared to the conventional circular coil, it is possible to produce high-efficiency electric motor and generator, and since the entire unit coil 100 is formed in an integrated shape to have no joint portion or welding portion, it is advantageous to secure electric properties and physical rigidity.

In addition, of course, it is possible to obtain various additional effects by having a meaningful three-dimensional geometric shape such as detailed shapes of a variable geometry and individual layers L throughout the multiple layers L.

On the other hand, in the embodiment, end winding connection portions 130 may be formed at both end portions of the unit coil 100, that is, a layer L located on the outermost outer diameter portion of the electric motor and a layer L located on the innermost inner diameter portion thereof.

The end winding connection portion 130 has a structure in which an end winding member 200 (see FIG. 6) for connection with another unit coil 100 may be connected, and may be formed in various shapes without limitation.

Figure 6:
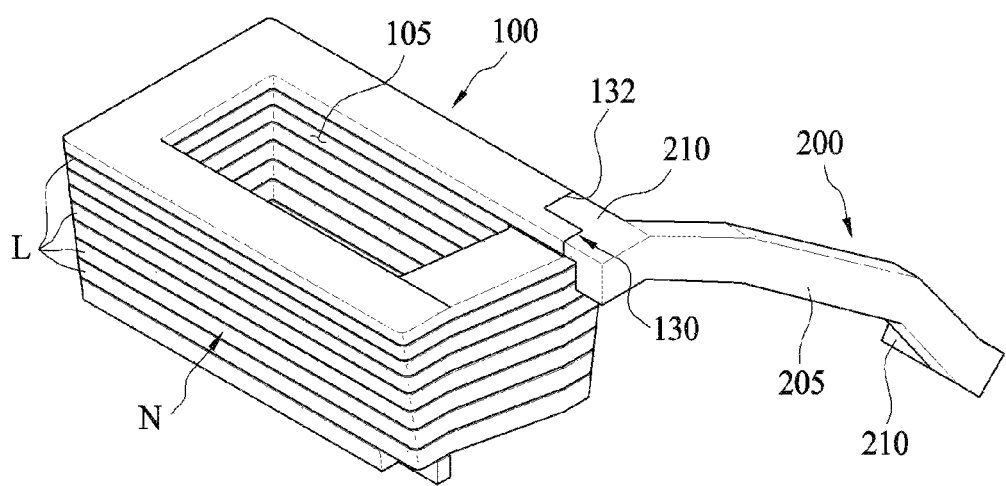
FIG. 6 is a view illustrating an appearance in which an end winding member is connected to the unit coil in the flat-angled coil according to the first embodiment of the present invention.

In the first embodiment of the present invention illustrated in FIG. 6, an end portion of the unit coil 100 is provided within a laterally cross-sectional area of the unit coil 100, and the end winding connection portion 130 has a shape formed so that at least a part of the width of the end portion of the unit coil 100 is removed to form a step 132 in a lateral direction.

That is, the end portion of the unit coil 100 is formed so as not to protrude beyond the area of the unit coil 100, and may be connected to the end winding member 200 through the lateral step 132.

Accordingly, the end winding member 200 may include a first connection portion 210 formed in the form of a lateral step similarly so as to engage with the lateral step 132 for connection with the lateral step 132.

At this time, the first connection portions 210 are formed at both end portions of the end winding member 200, and the first connection portion 210 on one side and the first connection portion 210 on the other side formed on the opposite side thereto may be connected to end winding connection portions 130 of another unit coil 100. Accordingly, the end winding member 200 may perform electrical connection between the different unit coils 100 from each other.

In addition, in the embodiment, the end winding member 200 may include an extension portion 205 elongated to connect the first connection portion 210 on one side and the first connection portion 210 on the other side formed on the opposite side thereto. The length of the extension portion 205 may be determined according to a separation distance between the unit coils 100 connected to each other by the end winding member 200.

Figure 7:
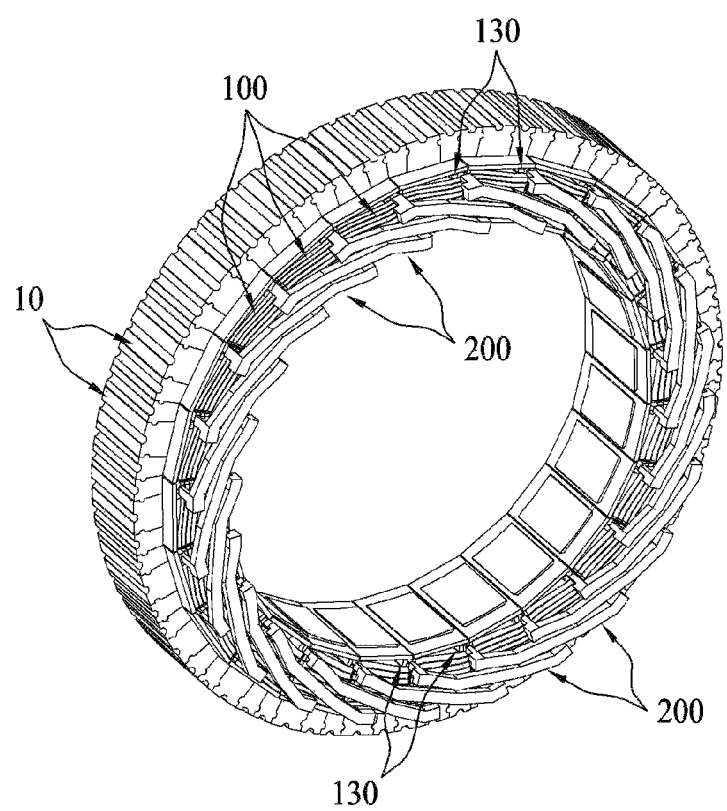
FIG. 7 is a view illustrating an appearance in which the flat-angled coil according to the first embodiment of the present invention is applied to an electric motor.

In the embodiment, as illustrated in FIG. 7, in the end winding member 200, the first connection portion 210 on one side thereof is connected to an end winding connection portion 130 formed on an outermost outer diameter portion of any one unit coil 100 of multiple unit coils 100 provided in the electric motor. The first connection portion 210 on the other side thereof has a shape connected to the end winding connection portion 130 formed on the innermost inner diameter portion of the unit coil 100 spaced apart by two spaces from the unit coil 100 connected with the first connection portion 210 on one side thereof. Accordingly, all the unit coils 100 provided in the electric motor may be electrically connected to each other.

Figure 8:
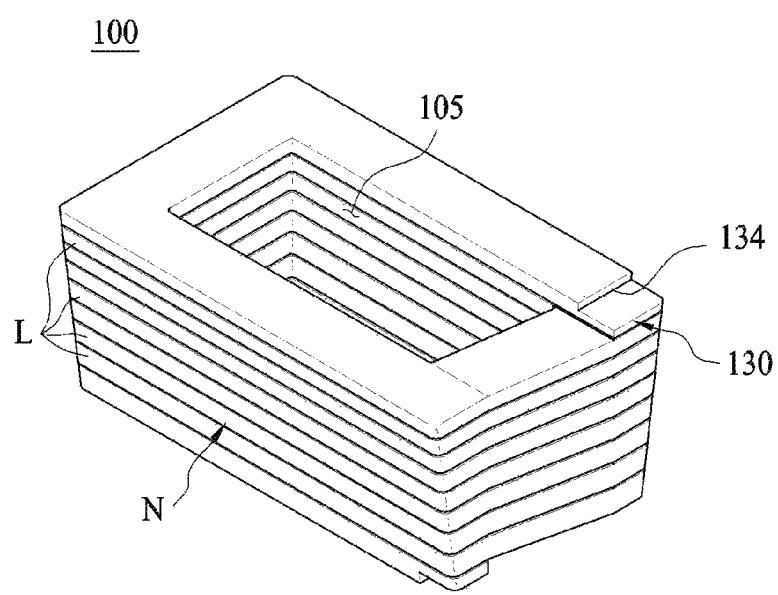
FIG. 8 is a view illustrating an overall appearance of a unit coil in a flat-angled coil according to a second embodiment of the present invention.
Figure 9:
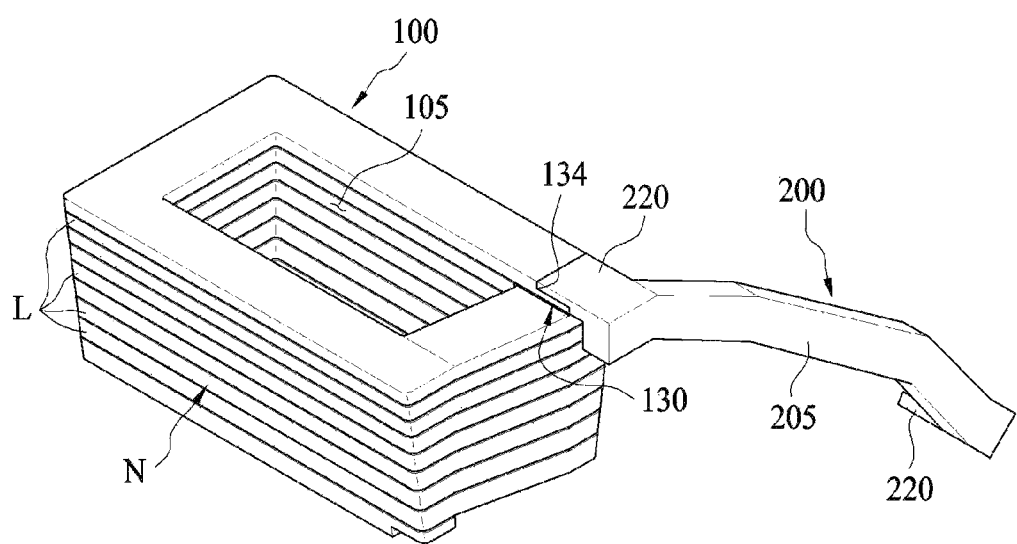
FIG. 9 is a view illustrating an appearance in which an end winding member is connected to the unit coil in the flat-angled coil according to the second embodiment of the present invention.

In FIGS. 8 and 9, shapes of a unit coil 100 and an end winding member 200 of a second embodiment of the present invention are illustrated.

The second embodiment illustrated in FIGS. 8 and 9 is the same as the first embodiment in that an end portion of the unit coil 100 is provided within a laterally cross-sectional area of the unit coil 100. However, the second embodiment is different from the first embodiment in that the end winding connection portion 130 has a shape formed so that at least a part of the thickness of the end portion of the unit coil 100 is removed to form a step 134 in a vertical direction.

That is, the end portion of the unit coil 100 is formed so as not to protrude beyond the area of the unit coil 100, and may be connected to the end winding member 200 through the vertical step 134.

Accordingly, the end winding member 200 may include a second connection portion 220 formed in the form of a vertical step similarly so as to engage with the vertical step 134 for connection with the vertical step 134.

At this time, the first connection portions 210 are formed at both end portions of the end winding member 200, and the end winding member 200 is the same as that of the first embodiment described above in that the end winding member 200 includes an extension portion 205 elongated to connect the first connection portion 210 on one side thereof and the first connection portion 210 on the other side formed on the opposite side thereto, and thus, the detailed description thereof will be omitted.

Figure 10:
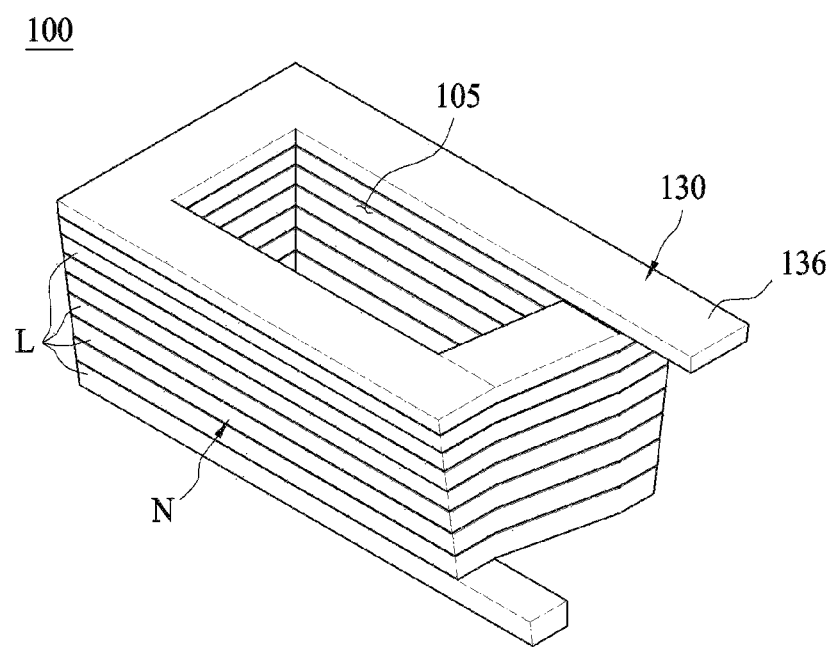
FIG. 10 is a view illustrating an overall appearance of a unit coil in a flat-angled coil according to a third embodiment of the present invention.
Figure 11:
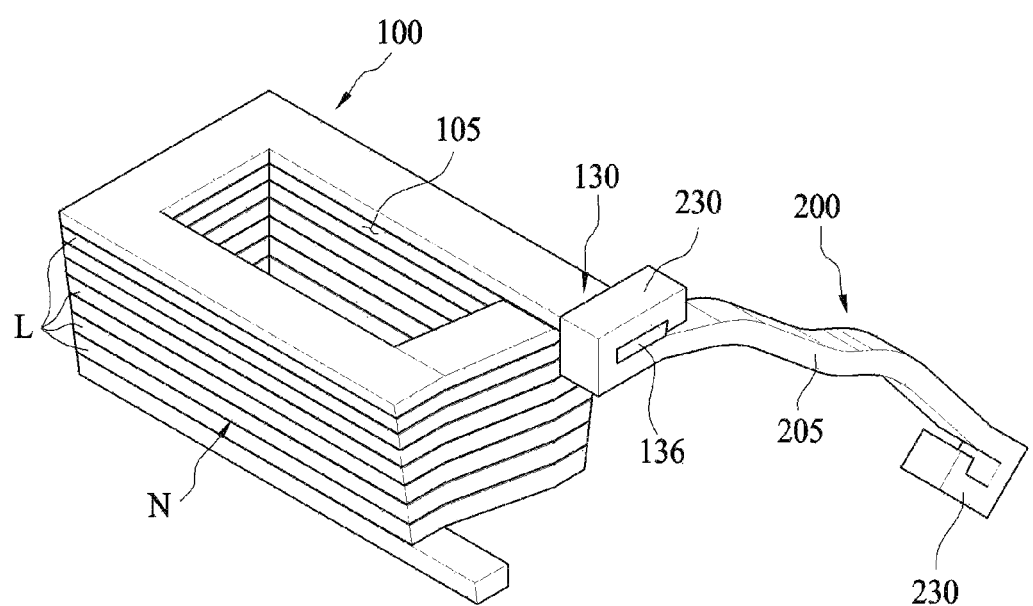
FIG. 11 is a view illustrating an appearance in which an end winding member is connected to the unit coil in the flat-angled coil according to the third embodiment of the present invention.

In FIGS. 10 and 11, shapes of a unit coil 100 and an end winding member 200 of a third embodiment of the present invention are illustrated.

In the case of the third embodiment illustrated in FIGS. and 11, unlike the above-described embodiments, the end winding connection portion 130 has a protrusion portion 136 formed to protrude above a laterally cross-sectional range of the unit coil 100 and the end winding connection portion 130 includes a third connection portion formed to surround the protrusion portion 136.

At this time, the first connection portions 210 are formed at both end portions of the end winding member 200, and the end winding member 200 is the same as that of the first embodiment described above in that the end winding member 200 includes an extension portion 205 elongated to connect the first connection portion 210 on one side thereof and the first connection portion 210 on the other side formed on the opposite side thereto, and thus, the detailed description thereof will be omitted.

As described above, in the present invention, the shapes of the end winding member 200 and the end winding connection portion 130 may be formed without limitation, and of course, may also have other embodiments.

As described above, the prepared embodiments of the present invention have been described and it will be apparent to those skilled in the art that the present invention can be materialized in other specific forms without departing from the gist or the scope in addition to the above described embodiments. Therefore, the aforementioned embodiments are not limited but should be considered to be illustrative, and accordingly, the present invention is not limited to the above description and may also be modified within the scope of the appended claims and an equivalent range thereto.

The invention claimed is:

1. A flat-angled coil comprising a unit coil including multiple layers which are provided to surround the peripheries of teeth of a core provided on an electric motor and laminated along the longitudinal direction of the teeth of the core so as to be integrally connected to each other continuously,
   wherein the unit coil is formed such that at least a part of an adjacent portion thereof, which is adjacent to another unit coil provided in the same slot formed between the surrounded teeth of the core and the teeth of an adjacent core, is non-parallel with the side surfaces of the surrounded teeth of the core,
   wherein each layer of the unit coil comprises,
      a slot insertion region inserted into a slot between the teeth of the cores adjacent to each other; and
      an exposure region which is connected to form a predetermined angle from the slot insertion region and provided outside the slot,
   wherein the unit coil is formed so that the width of the slot insertion region is gradually increased toward the layer in the outer diameter portion direction from the inner diameter portion of the electric motor,
   wherein the unit coil has the same width of the exposure region formed for each layer.

2. The flat-angled coil of claim 1, wherein the adjacent portion of the unit coil is formed to be non-parallel with side surfaces of the teeth of the core surrounded in a continuous straight shape throughout the multiple layers.

3. The flat-angled coil of claim 2, wherein an angle between the side surfaces of the teeth of the core surrounded by the unit coil and the adjacent portion is determined by a geometric shape of the unit coil, which may be changed according to the number of slots provided in the electric motor.

4. The flat-angled coil of claim 1, wherein the unit coil is formed so that the thickness thereof is gradually decreased toward the layer in the outer diameter portion direction from the inner diameter portion of the electric motor.

5. The flat-angled coil of claim 1, wherein in both end portions of the unit coil, end winding connection portions to which an end winding member for connection with another unit coil is connected are formed.

6. The flat-angled coil of claim 5, wherein an end portion of the unit coil is provided within a laterally cross-sectional range of the unit coil, and
   the end winding connection portion is formed so that at least a part of the width of the end portion of the unit coil is removed to form a step in a lateral direction.

7. The flat-angled coil of claim 5, wherein an end portion of the unit coil is provided within a laterally cross-sectional range of the unit coil, and
   the end winding connection portion is formed so that at least a part of the thickness of the end portion of the unit coil is removed to form a step in a vertical direction.

8. The flat-angled coil of claim 5, wherein the end winding connection portion is formed to protrude above the laterally cross-sectional range of the unit coil.

9. An electric motor comprising the flat-angled coil of claim 1.

* * * * *